(12) United States Patent
Curry et al.

(10) Patent No.: US 9,641,499 B2
(45) Date of Patent: May 2, 2017

(54) ONE-WAY INTERFACE FOR PI TO PI DATA TRANSFER

(71) Applicant: Owl Computing Technologies, Inc., Ridgefield, CT (US)

(72) Inventors: John Curry, New River, AZ (US); Ronald Mraz, South Salem, NY (US)

(73) Assignee: Owl Computing Technologies, LLC, Ridgefield, CT (US)

( * ) Notice: Subject to any disclaimer, the term of this patent is extended or adjusted under 35 U.S.C. 154(b) by 398 days.

(21) Appl. No.: 13/940,339

(22) Filed: Jul. 12, 2013

(65) Prior Publication Data
US 2015/0020155 A1    Jan. 15, 2015

(51) Int. Cl.
| | | |
|---|---|---|
| H04L 29/06 | (2006.01) | |
| H04L 29/08 | (2006.01) | |
| H04L 12/24 | (2006.01) | |
| G06F 17/30 | (2006.01) | |

(52) U.S. Cl.
CPC ........ *H04L 63/08* (2013.01); *G06F 17/30289* (2013.01); *H04L 41/0859* (2013.01); *H04L 67/1095* (2013.01); *H04L 63/04* (2013.01); *H04L 67/12* (2013.01)

(58) Field of Classification Search
USPC ............ 726/3, 2, 21, 36; 713/150, 163, 181; 380/255, 264, 276
See application file for complete search history.

(56) References Cited

U.S. PATENT DOCUMENTS

| | | |
|---|---|---|
| 7,218,974 B2 | 5/2007 | Rumi et al. |
| 7,260,833 B1 * | 8/2007 | Schaeffer .......................... 726/3 |
| 7,441,030 B1 | 10/2008 | Smith et al. |
| 7,627,611 B2 | 12/2009 | Gusciora |
| 8,068,415 B2 | 11/2011 | Mraz |
| 8,139,581 B1 * | 3/2012 | Mraz et al. .................... 370/392 |
| 8,312,320 B2 | 11/2012 | Almadi et al. |
| 2006/0106747 A1 * | 5/2006 | Bartfai et al. ..................... 707/1 |
| 2012/0209967 A1 * | 8/2012 | Gopalakrishnan ............ 709/219 |

OTHER PUBLICATIONS

Brochure: Waterfall for OSIsoft PI®—Cyber Security Solution for OSIsoft PI® Server Replication—Oct. 2010.

* cited by examiner

*Primary Examiner* — Farid Homayounmehr
*Assistant Examiner* — Sharif E Ullah
(74) *Attorney, Agent, or Firm* — Economou Silfin LLP; John S. Economou

(57) ABSTRACT

A system for transferring information from a first PI server coupled to a first network to a second PI server coupled to a second network. The system includes a source platform coupled to the first network and in communication with the first PI server, a receive platform coupled to the second network and in communication with the second PI server, and a one-way data link coupling the source platform to the receive platform. The source platform is configured to read transfer configuration information from the first PI server and to dynamically modify the transfer parameters based thereon. The receive platform is configured to, if there is changed database record configuration information, continually store a current predefined portion of the historical information in memory without transferring such information to the second PI server until a user, via a user interface, authorizes the release of such information to the second PI server.

5 Claims, 1 Drawing Sheet

ONE-WAY INTERFACE FOR PI TO PI DATA TRANSFER

FIELD OF INVENTION

This invention relates generally to improvements to a one-way data interface for transferring data from a first PI server in a first security network domain to a second PI server in a second security network domain.

BACKGROUND OF THE INVENTION

Manufacturing processes and associated industrial process control systems produce a large amount of process information, and software applications are available that provide access in real-time to such information. One such software package is the PI Server from OSIsoft of San Leandro, Calif. The PI Server acquires, stores, and processes large amounts of process information, enterprise-wide. The PI Server can typically store large amounts of raw measurement data at the original resolution and client application programs provide users throughout the enterprise system access to this real-time information. In some situations, however, the PI Server is located within a secure area (i.e., within an isolated process control network) while the client applications run on computers outside that secure area (i.e,. computers coupled to a separate corporate business network). In this situation, a secondary PI Server can be set up coupled to the business network, with an additional interface which transfers the information from the secure area PI Server (the "primary PI Server") to the secondary PI Server. Although OSIsoft provides an application (called the "PI to PI Interface") that allows the transfer of information from a first PI Server to a second PI Server, this interface is relatively insecure because it uses a two-way TCP/IP-based network connection to transfer data from the first PI Server (the source server) to the second PI Server (the receiving server).

Owl Computing Technologies, Inc. ("Owl") provides a more secure method of transferring data from a primary PI Server within a secure network domain (e.g., NIST level 3) to a secondary PI Server outside the secure network domain (i.e., within a network domain less secure than the secure network domain such as NIST level 2). Such a system 100 is shown in FIG. 1 and uses a one-way data link 110 to transfer information from the primary PI Server 102 in the secure network domain 120 (the area to the left of the dotted line 122) to the secondary PI Server 118 in the less-secure network domain 121 (the area to the right of the dotted line 122). In particular, the primary PI Server 102 runs on a source platform 101 within the secure network domain 120, and is coupled to a first network 104 via a TCP/IP interface 103. An OwlPI application 107 runs on a send server platform 106 which is also coupled to network 104 via a TCP/IP interface 105. The OwlPI application receives information from the primary PI Server 102 and converts the information to UDP packets that are forwarded to MUX 108, which forwards the UDP packets to a transmit application 109. Transmit application 109 is coupled to a receive application 111 in the receive server via a one-way data link 110. The combination of transmit application 109, one-way link 110 and receive application may comprise an Owl Computing Technologies Dual Diode (described in U.S. Pat. No. 8,068,415, the disclosure of which is incorporated herein by reference). Transmit application 109 forwards the UDP packets across the one-way link 110 to receive application 111, which, in turn, forwards the packets to DEMUX 112 for transmission to the OwlPI application 113 running on the receive platform 114. MUX 108 and DEMUX 112 are included because in some situations more than one OwlPI application 107 may be running on send server 106, and thus a corresponding number of OwlPI applications 113 will be running on receive server 215. MUX 108 and DEMUX 112 are used to route information from/to the appropriate corresponding OwlPI applications 107, 113 in such situations. One of ordinary skill in the art will readily recognize that the MUX 108 and DEMUX 112 may be omitted when only one occurrence of the OwlPI application 207 is used. Receive platform is coupled to a second network 116 within the less-secure network domain 121 via a TCP/IP interface 115. The secondary PI Server 118 runs on a destination platform 119, which is coupled to the second network 116 via a TCP/IP interface 117. The OwlPI application 113 receives the UDP packets and converts the information therein into appropriate updates for transmission to secondary PI Server 118.

System 100 continually and repeatedly copies PI database records, snapshot data, digital state tables, and historical archive data from primary PI Server 102 to secondary PI Server 118 using a single UDP connection. The database records (point records) constitute information about the type of data (e.g., floating point, integer, character array, etc.) to be stored in the associated record. Snapshot data constitutes the most recent data for each PI tag. The digital state tables define the states that correspond to the values for digital PI tags (e.g., Open/Closed for a valve or On/Off for a switch). For historical archive data, system 100 continuously transmits a pre-set amount of historical data (e.g., a selected period between 1000 and 50000 minutes). A problem may arise when a particular PI database record is updated at the primary PI Server 102, which may occur when the source of the information for the associated PI tag is updated and the form of such information changes (e.g., from integer to floating point). This PI database record is automatically updated at the secondary PI Server 118, but no notice is given to users accessing such PI tag information via network 116. In some cases, for example, such PI tag information is automatically imported into user spreadsheets or other local databases and may cause errors or inaccuracies due to the change in format of such information. Another problem may arise because the parameters used to define how the historical data update is performed are static, and any change to such parameters requires that system 100 be taken offline.

It is an object of the present invention to provide an improved one-way interface between a source PI Server and a destination PI Server which overcomes the problems with the prior art.

SUMMARY OF THE INVENTION

The present invention provides, in one embodiment, a system for transferring information from a first PI server coupled to a first network to a second PI server coupled to a separate second network. The system includes a source platform coupled to the first network and in communication with the first PI server, a receive platform coupled to the second network and in communication with the second PI server, and a one-way data link coupling the source platform to the receive platform. The first PI server includes historical information and transfer configuration information. The source platform is configured to continually receive a predefined portion of the historical information according to preset parameters from the first PI server and to transfer the predefined portion of the historical information to the receive platform via the one-way data link. The source platform is also configured to read the transfer configuration information from the first PI server and modify the preset parameters based on any change indicated therein without stopping the transfer. The receive platform is configured to receive the predefined portion of the historical information from the source platform via the one-way data link, to query the second PI server to determine if a corresponding portion of the historical data exists on the second PI server, and if a corresponding portion of the historical data does not exist on the second PI server, to transfer the current portion of the historical information to the secondary PI server. The preset parameters may include a time period value, a time slice value and/or a transfer speed value.

The present invention provides, in another embodiment, a system for transferring information from a first PI server coupled to a first network to a second PI server coupled to a separate second network. The system includes a source platform coupled to the first network and in communication with the first PI server, a receive platform coupled to the second network and in communication with the second PI server, the receive platform including a temporary storage memory and a network user interface, and a one-way data link coupling the source platform to the receive platform. The first PI server includes historical information and database record configuration information. The source platform is configured to continually receive a predefined portion of the historical information according to preset parameters and any changed database record configuration information from the first PI server and to transfer the predefined portion of the historical information and any changed database record configuration information to the receive platform via the one-way data link. The receive platform is configured to receive the predefined portion of the historical information and any changed database record configuration information from the source platform via the one-way data link. The receive platform is further configured, if there is no changed database record configuration information, to query the second PI server to determine if a corresponding portion of the historical data exists on the second PI server, and if a corresponding portion of the historical data does not exist on the second PI server, to transfer the current portion of the historical information to the secondary PI server. In addition, the receive platform is also configured to, if there is changed database record configuration information, continually store a current predefined portion of the historical information in the temporary storage memory without transferring such information to the second PI server until a user, via the network user interface, authorizes the release of such information to the second PI server.

BRIEF DESCRIPTION OF THE DRAWINGS

The following detailed description, given by way of example and not intended to limit the present invention solely thereto, will best be understood in conjunction with the accompanying drawings in which.

DETAILED DESCRIPTION OF THE PREFERRED EMBODIMENTS

In the present disclosure, like reference numbers refer to like elements throughout the drawings, which illustrate various exemplary embodiments of the present invention.

Figure 2:
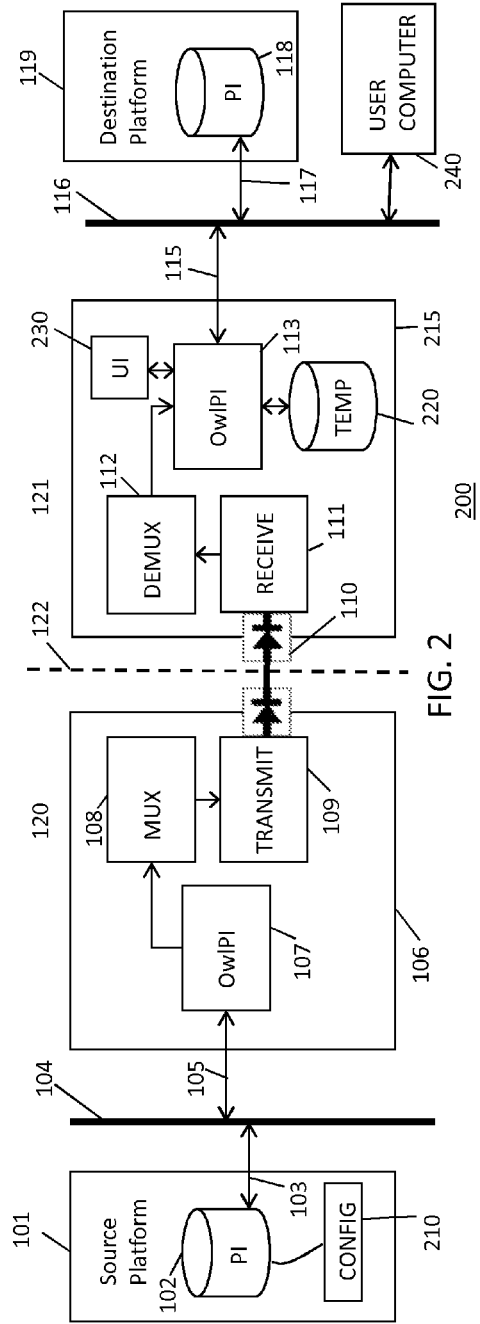
FIG. 2 is a block diagram of a one-way PI server to PI server data transfer system embodying features of the present invention.

Referring now to the drawings and in particular to FIG. 2, a preferred embodiment of the present invention is shown. Historical data for all selected points is continuously retransmitted from send server 106 to receive server 215. The selected points are captured on a list. A user defines the three parameters for the transmission of the historical data: (1) BACKFILL_TIME (i.e., the number of minutes back in time for the historical data); (2) MAX_RECORDS (i.e., the maximum number of historical records to be transmitted per second); and (3) TIME_SLICE (i.e., the number of minutes to collect per point per query). These parameters are required because it takes more time to store records (on send server 106) than it does to read records (on receive server 215). Therefore, if no transfer speed limit was in place, system 200 could present more records to receive server 215 than could be processed at any given time. The send server 215 is configured to operate with a work stack (i.e., a memory for storing records presented at a rate faster than the rate at which the receive server 215 can process the received records) which continues to increase until it hits a predefined maximum (e.g., 10,000 entries). When the predefined maximum number of records in the work stack is reached, the work stack is flushed and storage begins again. In this situation, it is possible that data loss could occur.

The historical data collection process for a current time span begins with the first point. For example, when the current time is 15:00:00 and the BACKFILL_TIME is set to 60 minutes, all historical records which occurred between 15:00:00 to 14:00:00 are to be transferred. The process begins with the first (most recent) point in the PI system. Data for the first point is collected as dictated by the TIME_SLICE setting, i.e., data for the period from 15:00:00 to 14:57:00. The collected data is received by the send server 106 and then sent to receive server 215. The collected data will include a header that delineates the collection parameters for the following data and includes: point name, start time (e.g., 15:00:00) and end time (e.g., 14:57:00). When receive server 215 receives the collected data packet, the receive server 215 will query secondary PI server 118 for the same point, start time and end time. In this way, receive server 215 determines what values received from send server 106 need to be stored in secondary PI server 118. In other words, receive server 215 continually receives historical data from send server 106, checks secondary PI server 118 to see if it includes data for that particular time period and then, only if no data exists in the PI server 118 for that time period, then copies the received data to PI server 118.

As a next iterative step, data for the first point for the next time period, i.e., data for 14:57:00 to 14:54:00, is collected and transmitted to receive server 215. This iterative process continues for the first point until the time set by the BACKFILL_TIME variable is met, i.e., 14:03:00 to 14:00:00 in this example. When the first point is completed, historical data for the next point from the list is collected in the same way as the first point. The number of values actually transmitted to receive server 215 during the current process second is monitored. If the number of values collected in the current process second (e.g., during the period 15:00:00-15:00:01) exceeds the value stored in the MAX_RECORDS variable, the historical collection process is suspended until the top of the next process second (15:00:01).

As stated above, a query is performed against the PI database for the given TIME_SLICE for each point. It can be more efficient at the send server 106 to query for a longer TIME_SLICE because it results in fewer calls to the PI database. However, if there are a large number of historical values stored for each point, the results of the query can be quite large and the results of a query must be transmitted in its entirety to the receive server 215. Therefore, if the variable TIME_SLICE is set too large, the variable MAX_RECORDS can be exceeded for a given second (period) and can consequently cause the receive server 215 to fall behind on processing. If the variable TIME_SLICE is set too small, it can cause the send server 106 to take an excessive amount of time to process all of the points for the period set by the BACKFILL_TIME variable. For this reason, the send server 106 produces statistics every minute which tell a user the current status of the historical collection operation. These statistics can be used for tuning the historical collection process and consist of the current start time for the backfill operation, the current point number (e.g., point 100 of 37,000) being processed, the elapsed time of the last backfill operation, the elapsed time of the current backfill operation, the total number of values sent in the last backfill, and the total number of values sent so far for the current backfill operation. The receive server 215 also emits statistics that can be used as an aid in tuning the historical collection operation. In particular, the receive server 215 produces a stack length statistic which shows how much unprocessed work exists on receive server 215. If the stack length is continually increasing over time, a user can discern that the amount of historical data being transmitted by send server 106 is too large.

Figure 1:
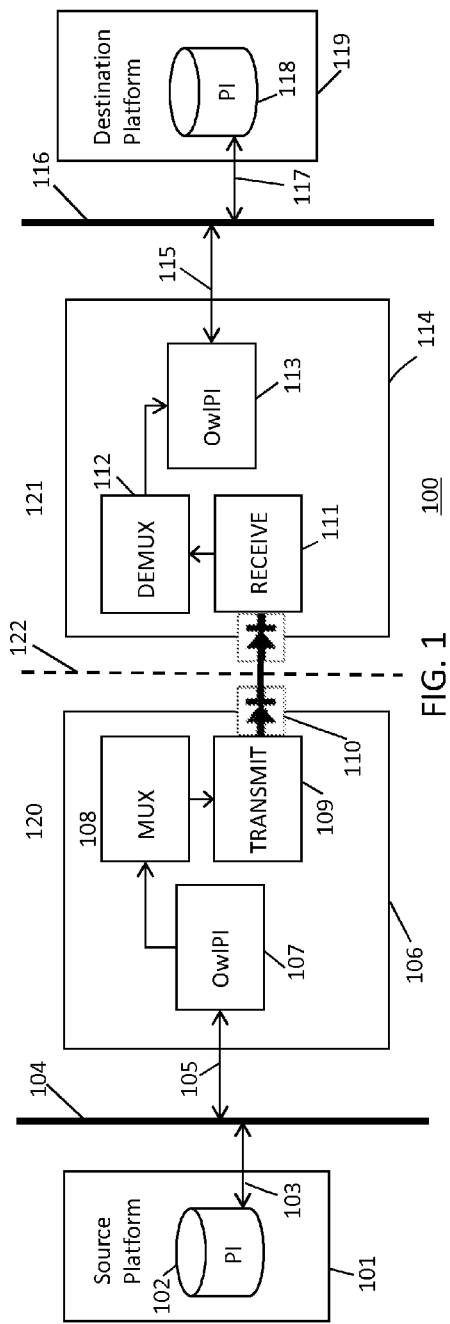
FIG. 1 is a block diagram of a conventional one-way PI server to PI server data transfer system.

In prior art systems, such as system 100 shown in FIG. 1, configuration of the three variables BACKFILL_TIME, MAX_RECORDS and TIME_SLICE was performed with system 100 off-line (i.e., with the data transfer halted) and any change to such variables also required that system 100 be off-line. This was undesirable because it meant that the secondary PI Server 118 would not be getting updates for the period of time that system 100 is off-line. System 200 provides an improvement in that the primary IP Server 102 includes a PI tag 210 which is used to dynamically change these variables. A user may conventionally access the config PI tag 210 via network 104 and change these variables in an effort to fine-tune processing, e.g., based on the statistics produced by send server 106 and receive server 215. During operation, the OwlPI application 107 dynamically reads the PI tag 210 (upon an indication that the data therein has changed) and modifies operations accordingly, without any need to halt the operation of the transmit platform 106.

As discussed above, one other problem that arises in prior art systems is that changes in the formatting of a particular PI tag in primary PI server 102 automatically propagate through to the secondary PI server 118. In system 200, a temporary database 230 is included in receive platform 215 and coupled to OwlPI application 113. A user interface application 220 runs on receive platform 215 and is also coupled to OwlPI application 113. In operation, when the OwlPI application 113 receives an updated database record, the updated database record and all subsequent data for the associated PI tag is stored in temporary database 230 but is not sent to secondary PI database 118 until a user, e.g., a user at user computer 240, accesses the user interface 220 and authorizes transmission of the information stored in the temporary database 230 to be released to secondary PI Server 118. In this manner, it can be ensured that any user programs, e.g., spreadsheets, which are manually or automatically populated from secondary PI server 118 are updated to accommodate any changes identified in the updated database record prior to receiving data from the secondary PI server 118 in the updated format.

Although the present invention has been particularly shown and described with reference to the preferred embodiments and various aspects thereof, it will be appreciated by those of ordinary skill in the art that various changes and modifications may be made without departing from the spirit and scope of the invention. It is intended that the appended claims be interpreted as including the embodiments described herein, the alternatives mentioned above, and all equivalents thereto.

What is claimed is:

1. A system for transferring information from a first PI server on a source platform computer coupled to a first network to a second PI server on a destination platform computer coupled to a separate second network, comprising:
   a send platform computer coupled to the first network and in communication with the first PI server;
   a receive platform computer coupled to the second network and in communication with the second PI server; and
   a one-way data link coupling the send platform computer to the receive platform computer, the one-way data link configured to transfer data only from the send platform computer to the receive platform computer and to prevent any signal from passing from the receive platform computer to the send platform computer;
   wherein the first PI server includes historical information and transfer configuration information, wherein the send platform computer is configured to continually receive a predefined portion of the historical information according to preset parameters from the first PI server and transfer the predefined portion of the historical information to the receive platform computer via the one-way data link, wherein the send platform computer is also configured to read the transfer configuration information from the first PI server and modify the preset parameters based on any change indicated therein without stopping the transfer, wherein the receive platform computer is configured to receive the predefined portion of the historical information from the send platform computer via the one-way data link, to query the second PI server to determine if a corresponding portion of the historical data exists on the second PI server, and if a corresponding portion of the historical data does not exist on the second PI server, to transfer the current portion of the historical information to the secondary PI server, and wherein the receive platform computer is coupled to the send platform computer only via the one-way data link.

2. The system of claim 1, wherein the preset parameters include a time period value.

3. The system of claim 1, wherein the preset parameters include a time slice value.

4. The system of claim 1, wherein the preset parameters include a transfer speed value.

5. A system for transferring information from a first PI server on a source platform computer coupled to a first network to a second PI server on a destination platform computer coupled to a separate second network, comprising:
   a send platform computer coupled to the first network and in communication with the first PI server;
   a receive platform computer coupled to the second network and in communication with the second PI server, the receive platform computer including a temporary storage memory and a network user interface; and
   a one-way data link coupling the send platform computer to the receive platform computer, the one-way data link configured to transfer data only from the send platform computer to the receive platform computer and to prevent any signal from passing from the receive platform computer to the send platform computer;

wherein the first PI server includes historical information and database record configuration information, wherein the send platform computer is configured to continually receive a predefined portion of the historical information according to preset parameters and any changed database record configuration information from the first PI server and to transfer the predefined portion of the historical information and any changed database record configuration information to the receive platform computer via the one-way data link, wherein the receive platform computer is configured to receive the predefined portion of the historical information and any changed database record configuration information from the send platform computer via the one-way data link, wherein the receive platform computer is further configured, if there is no changed database record configuration information, to query the second PI server to determine if a corresponding portion of the historical data exists on the second PI server, and if a corresponding portion of the historical data does not exist on the second PI server, to transfer the current portion of the historical information to the secondary PI server, wherein the receive platform computer is further configured, if there is changed database record configuration information, to continually store a current predefined portion of the historical information in the temporary storage memory without transferring such information to the second PI server until a user, via the network user interface, authorizes the release of such information to the second PI server, and wherein the receive platform computer is coupled to the send platform computer only via the one-way data link.

* * * * *